United States Patent [19]
Hoch et al.

[11] Patent Number: 5,632,016
[45] Date of Patent: May 20, 1997

[54] SYSTEM FOR REFORMATTING A RESPONSE PACKET WITH SPEED CODE FROM A SOURCE PACKET USING DMA ENGINE TO RETRIEVE COUNT FIELD AND ADDRESS FROM SOURCE PACKET

[75] Inventors: Gary B. Hoch, Coral Springs; Timothy V. Lee, Boca Raton; Rex E. McCrary, Boca Raton; Stephanie P. Payne, Boca Raton; Daniel Petkevich, Ft. Lauderdale; Hai V. Pham, Margate, all of Fla.

[73] Assignee: International Business Machines Corporation, Armonk, N.Y.

[21] Appl. No.: 313,490

[22] Filed: Sep. 27, 1994

[51] Int. Cl.⁶ .................... G06F 13/14; G06F 13/28
[52] U.S. Cl. ............. 395/200.02; 395/286; 364/229; 364/240; 364/242.3; 364/284; 364/935.9
[58] Field of Search .................. 370/85.1, 94.1; 395/200.16, 200.05, 200.09, 853, 200.2, 286, 550; 364/229, 240, 242.3, 284, 935.4

[56] References Cited

U.S. PATENT DOCUMENTS

| | | | |
|---|---|---|---|
| 4,601,586 | 7/1986 | Bahr et al. | 370/94.1 |
| 4,719,621 | 1/1988 | May | 370/85 |
| 4,760,572 | 7/1988 | Tomikawa | 370/94 |
| 4,884,266 | 11/1989 | Pflaumer | 370/84 |
| 4,982,400 | 1/1991 | Ebersole | 370/85.15 |
| 5,103,446 | 4/1992 | Fischer | 370/85.1 |
| 5,469,435 | 11/1995 | Krein et al. | 370/85.2 |

OTHER PUBLICATIONS

"IEEE Standard for a High Performance Serial Bus", The Institute of Electrical And Electronic Engineers, Inc., Draft 7.1v1, IEEEP1394, Aug. 5, 1994.

Marazas, et al., "Information Technology—SCSI–3 Serial Bus Protocol (SBP)", X3T10 992D, Rev. 18, Working Draft, Aug. 11, 1994.

TSB12C01, P1394 High–Speed Serial–Bus Link–Layer Controller Data Manual, Linear Products, 1994, Texas Instruments Incorporated.

TSB11C01, P1394 Triple–Cable Transceiver/Arbiter, SLLS167–Mar. 1994, Texas Instruments Incorporated.

Teener, Michael, A Bus on a Diet—The Serial Bus Alternative, COMPCON Spring '92 IEEE Computer Society Conf., pp. 316–321.

*Primary Examiner*—Thomas C. Lee
*Assistant Examiner*—Anderson I. Chen
*Attorney, Agent, or Firm*—Bernard D. Bogdon

[57] ABSTRACT

A high performance serial bus operating at multiple transmission rates is disclosed. The serial bus is able to automatically generate data response packets for return to a requesting node. The automatic packet generation uses the source and destination information to generate a return destination packet for directing the requested data to the request source destination. Since the bus network is capable of operating at several different transmission rates, the speed at which the data request packet was transmitted is used for retransmitting the data requested back to the source node requesting the data.

6 Claims, 7 Drawing Sheets

SYSTEM FOR REFORMATTING A RESPONSE PACKET WITH SPEED CODE FROM A SOURCE PACKET USING DMA ENGINE TO RETRIEVE COUNT FIELD AND ADDRESS FROM SOURCE PACKET

CROSS-REFERENCE TO RELATED APPLICATION

The present application is related to U.S. patent application Ser. No. 08/313,680, pending, entitled "Method And System For Matching Packet Size For Efficient Transmission Over a Serial Bus," U.S. patent application Ser. No. 08/312,854, pending, entitled "Acyclic Cable Bus Having Redundant Path Access", U.S. patent application Ser. No. 08/313,679, now pending, entitled "Method For Generating Topology Map For A Serial Bus", U.S. patent application Ser. No. 08/313,883, now U.S. Pat. No. 5,504,757, entitled "Method For Selecting Transmission Speeds For Transmitting Data Packets Over A Serial Bus", U.S. patent application Ser. No. 08/312,746, now pending, entitled "Method And System For Determining Maximum Cable Segments On A Serial Bus Having Multiple Transmission Rates", U.S. patent application Ser. No. 08/313,638, now pending, entitled "Method And System For Dynamically Appending Data To Data Structures For Transmission Over A Serial Bus", and all filed of even date herewith by the inventors hereof and assigned to the assignee herein, and incorporated by reference herein.

BACKGROUND OF THE INVENTION

1. Technical Field

The present invention relates generally to sending and receiving data over a serial bus, and, more particularly, to the automatic generation and retransmission of data read responses upon receipt of a data read request over the serial bus. More specifically still, the present invention relates to automatically transmitting data read responses based on an initial read request over a serial bus having a plurality of transmission rates, which read response is transmitted at the same speed as the initial read request.

2. Description of the Related Art

The IEEE High Performance Serial Bus P1394 (hereinafter P1394) proposed standard defines an electrical and physical interface for interconnection of P1394 devices, or nodes, via cables or an electrical backplane. The P1394 standard also defines various signalling and data transmissions protocols that are required to configure the collection of nodes into a working network and to support the configurations, which may include daisy chains or tree topologies; however, no loops are allowed in any of these topologies. Up to 63 nodes may be connected to a single P1394 bus and multiple busses may also be interconnected via P1394 bridge nodes. Up to 16 cable segments, or hops, may be present between any two nodes on the bus. In order to achieve optimum bus performance, the interpacket transmission gap time, or delay, is set as small as possible based on the maximum number of cable hops between any two devices. The maximum number of cable hops between any two devices connected to the bus can be determined if the bus topology is known.

The P1394 standard defines three possible speeds at which data packets can be transmitted between nodes on the bus. The possible speeds are approximately 100, 200, and 400 megabits per second. The maximum speed at which a data packet can be transmitted depends on the bus topology and the data transmission speeds supported by various nodes on the bus. The transmission speeds supported by a given node is determined by its physical layer, or PHY, hardware implementation. Any PHY that supports a particular maximum speed must also support all slower speeds. To determine the optimum speed at which a data packet can be sent, the maximum supported speeds of the transmitting and receiving nodes, as well as the maximum speed of any nodes connected between these nodes must be determined. The optimum speed for data transmission is equal to the highest speed that is supported by all the nodes that are required to participate in the transmission of the data packet. A topological map of the bus network is required in order to determine the optimum packet transmission speed.

Accordingly, what is needed is a method for supporting data transmission over a P1394 high performance serial bus that efficiently builds and transmits data requests.

SUMMARY OF THE INVENTION

It is therefore one object of the present invention to send and receive data over a computer system.

It is another object of the present invention to provide the automatic generation and retransmission of data read responses upon receipt of a data read request over the computer system.

It is yet another object of the present invention to automatically transmit data read responses based on an initial read request over a serial bus having multiple transmission rates, with the read responses being transmitted at the same speed as the initial read request.

The foregoing objects are achieved as is now described. According to the present invention, a high performance serial bus operating at multiple transmission rates is disclosed. The serial bus is able to automatically generate data response packets for return to a requesting node. The automatic packet generation uses the source and destination information to generate a return destination packet for directing the requested data to the request source destination. Since the bus network is capable of operating at several different transmission rates, the speed at which the data request packet was transmitted is used for retransmitting the data requested back to the source node requesting the data.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1A:
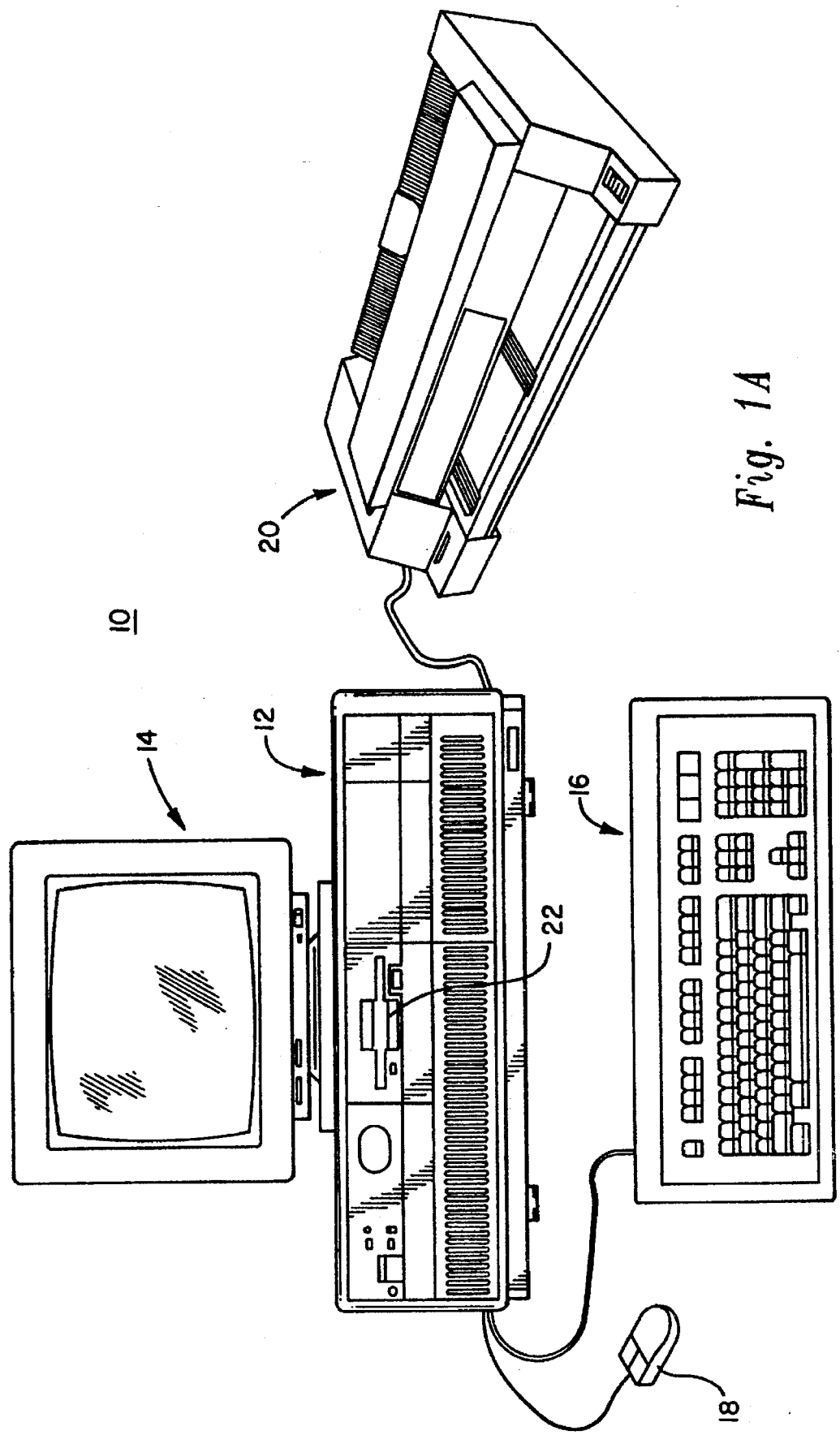
FIG. 1A depicts a data processing system in the form of a personal computer in which the present invention can be employed is depicted.

Referring now to the figures, and in particular to FIG. 1A, a data processing system, personal computer system 10, in which the present invention can be employed is depicted. As shown, personal computer system 10 comprises a number of components, which are interconnected together. More particularly, a system unit 12 is coupled to and can drive an optional monitor 14 (such as a conventional video display). A system unit 12 also can be optionally coupled to input devices such as a PC keyboard 16 or a mouse 18. Mouse 18 includes right and left buttons (not shown). The left button is generally employed as the main selector button and alternatively is referred to as the first mouse button or mouse button 1. The right button is typically employed to select auxiliary functions as explained later. The right mouse button is alternatively referred to as the second mouse button or mouse button 2. An optional output device, such as a printer 20, also can be connected to the system unit 12. Finally, system unit 12 may include one or more mass storage devices such as the diskette drive 22.

As will be described below, the system unit 12 responds to input devices, such as PC keyboard 16, the mouse 18, or local area networking interfaces. Additionally, input/output (I/O) devices, such as floppy diskette drive 22, display 14, printer 20, and local area network communication system are connected to system unit 12 in a manner well known. Of course, those skilled in the art are aware that other conventional components also can be connected to the system unit 12 for interaction therewith. In accordance with the present invention, personal computer system 10 includes a system processor that is interconnected to a random access memory (RAM), a read only memory (ROM), and a plurality of I/O devices.

In normal use, personal computer system 10 can be designed to give independent computing power to a small group of users as a server or a single user and is inexpensively priced for purchase by individuals or small businesses. In operation, the system processor functions under an operating system, such as IBM's OS/2 operating system or DOS. OS/2 is a registered trademark of International Business Machines Corporation. This type of operating system includes a Basic Input/Output System (BIOS) interface between the I/O devices and the operating system. BIOS, which can be stored in a ROM on a motherboard or planar, includes diagnostic routines which are contained in a power on self test section referred to as POST.

Figure 1B:
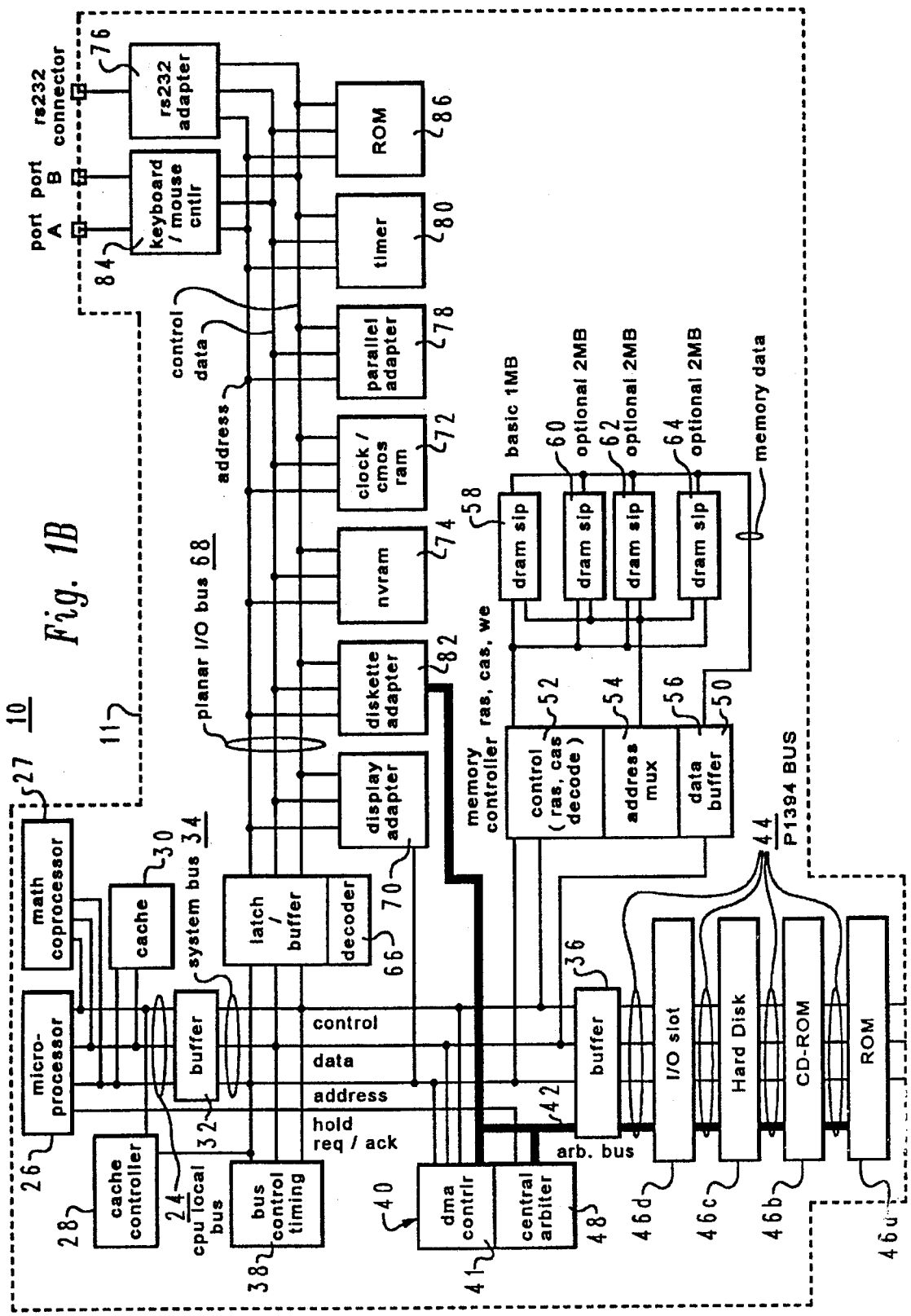
FIG. 1B is a block diagram of a personal computer system illustrating the various components of personal computer system in accordance with the present invention.

Prior to relating the above structure to the present invention, a summary of the operation in general of personal computer system 10 may merit review. Referring to FIG. 1B, there is shown a block diagram of personal computer system 10 illustrating the various components of personal computer system 10 in accordance with the present invention. FIG. 1B further illustrates components of planar 11 and the connection of planar 11 to I/O slots 46a–46d and other hardware of personal computer system 10. Connected to planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used for CPU 26, one suitable microprocessor is the Pentium microprocessor, which is sold by Intel Corporation. "Pentium" is a trademark of Intel Corporation.

While the present invention is described hereinafter with particular reference to the system block diagram of FIG. 1A, it is to be understood at the outset of the description which follows, it is contemplated that the apparatus and methods in accordance with the present invention may be used with other hardware configurations of the planar board. For example, the system processor could be an Intel 80286, 80386, or 80486 microprocessor. These particular microprocessors can operate in a real addressing mode or a protected addressing mode. Each mode provides an addressing scheme for accessing different areas of the microprocessor's memory.

Returning now to FIG. 1B, CPU local bus 24 (comprising data, address and control components) provides for the connection of CPU 26, an optional math coprocessor 27, a cache controller 28, and a cache memory 30. Also coupled on CPU local bus 24 is a buffer 32. Buffer 32 is itself connected to a slower speed (compared to the CPU local bus) system bus 34, also comprising address, data and control components. System bus 34 extends between buffer 32 and a further buffer 36. System bus 34 is further connected to a bus control and timing unit 38 and a Direct Memory Access (DMA) unit 40. DMA unit 40 is comprised of a central arbitration unit 48 and a DMA controller 41. Buffer 36 provides an interface between the system bus 34 and a serial bus such as the P1394 Serial Bus 44. Connected to bus 44 are a plurality of I/O slots or nodes 46a–46d for receiving P1394 adapter cards which may be further connected to an I/O device or memory. In the depicted example, I/O slot 46a has a hard disk drive connected to it; I/O slot 46b has a CD-ROM drive connected to it; and I/O slot 46c has a ROM on an adapter card connected to it. An arbitration control bus 42 couples the DMA controller 41 and central arbitration unit 48 to I/O slots 46 and diskette adapter 82. Also connected to system bus 34 is a memory control unit 50 which is comprised of a memory controller 52, an address multiplexer 54, and a data buffer 56. Memory control unit 50 is further connected to a random access memory as represented by RAM module 58. Memory controller 52 includes the logic for mapping addresses to and from CPU 26 to particular areas of RAM 58. While the perdonal computer system 10 is shown with a basic 1 megabyte RAM module, it is understood that additional memory can be interconnected as represented in FIG. 1B by the optional memory modules 60 through 64.

A further buffer 66 is coupled between system bus 34 and a planar I/O bus 68. Planar I/O bus 68 includes address, data, and control components respectively. Coupled along planar bus 68 are a variety of I/O adapters and other peripheral components such as display adapter 70 (which is used to drive an optional display 14), a clock 72, nonvolatile RAM 74 (hereinafter referred to as "NVRAM"), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

Clock 72 is used for time of day calculations. NVRAM 74 is used to store system configuration data. That is, the NVRAM will contain values which describe the present configuration of the system. For example, NVRAM 74 contains information which describe the capacity of a fixed disk or diskette, the type of display, the amount of memory, etc. Of particular importance, NVRAM 74 will contain data which is used to describe the system console configuration; i.e., whether a PC keyboard is connected to the keyboard/mouse controller 84, a display controller is available or the ASCII terminal is connected to RS232 adapter 76. Furthermore, these data are stored in NVRAM 74 whenever a special configuration program is executed. The purpose of the configuration program is to store values characterizing the configuration of this system to NVRAM 76 which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

Specifically, personal computer system 10 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and "PS/2" is a registered trademark of International Business Machines Corporation.

Since each P1394 slot or node within the computer system of FIG. 1A may operate at one of three speeds, there needs to be an efficient method by which a bus topology map can be constructed using the self ID packets. An efficient data structure for representing this bus topology map is useful in order to minimize packet transmission time between any two nodes in the network. The map is necessary to determine the maximum number of cable hops between any two devices, or nodes, for tuning the interpacket transmission gap timing, and also to determine the maximum data transmission speed between any two nodes.

Figure 2:
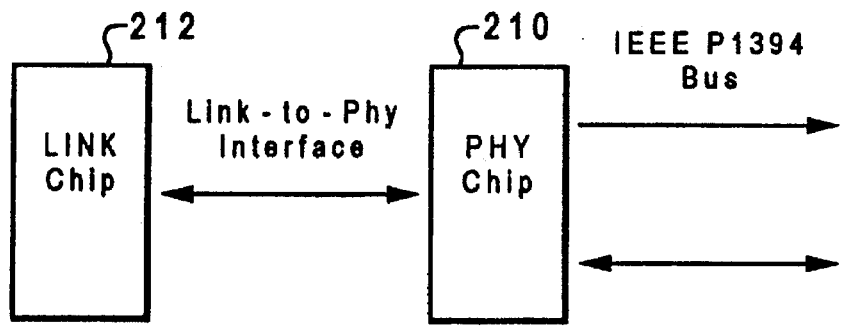
FIG. 2 depicts a link level controller for use on the networking system according to FIG. 1A.

To connect devices to the serial bus, P1394 has established a Link Level Controller, which is used to logically and physically connect a computer bus, such as, for example, a PCI bus, to the P1394 Link-to-Phy interface, which is also defined under P1394. FIG. 2 depicts a block diagram of packet data flow from a physical level controller, or PHY chip 210, to a link level controller, or LINK chip 212. Read request packets are received from the P1394 bus into LINK chip 212, after passing through PHY chip 210. LINK chip 212 automatically reformats the read request into a read response packet compatible with the P1394 standard. The read response packet is then automatically transmitted back to the P1394 bus at the same speed at which the read request was sent.

Figure 3:
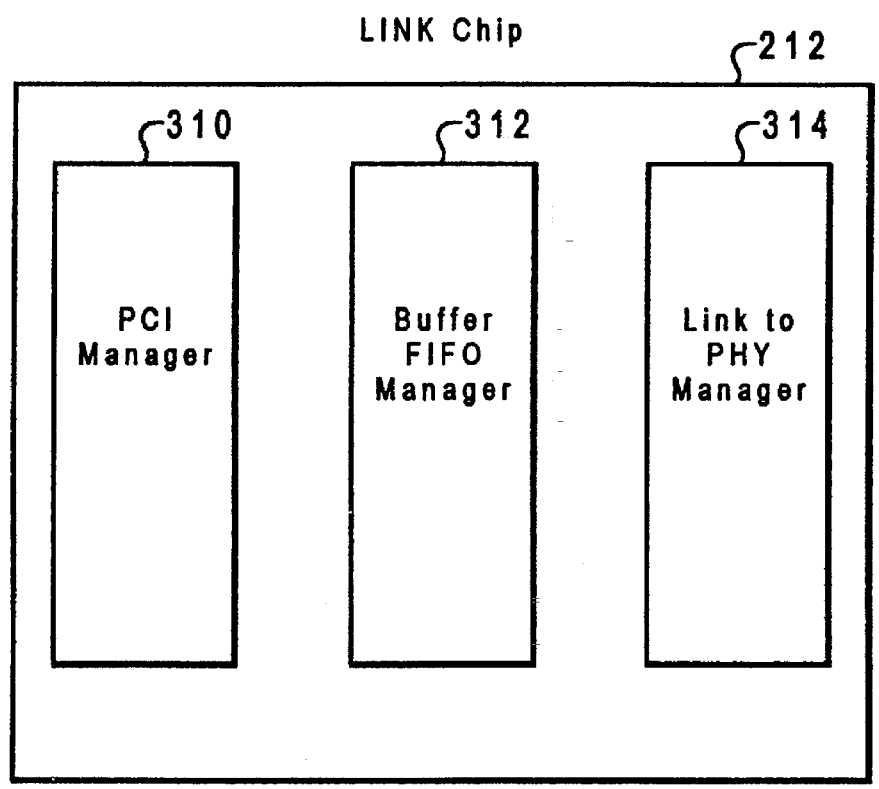
FIG. 3 is a block diagram of the link chip depicted in FIG. 2.
Figure 4:
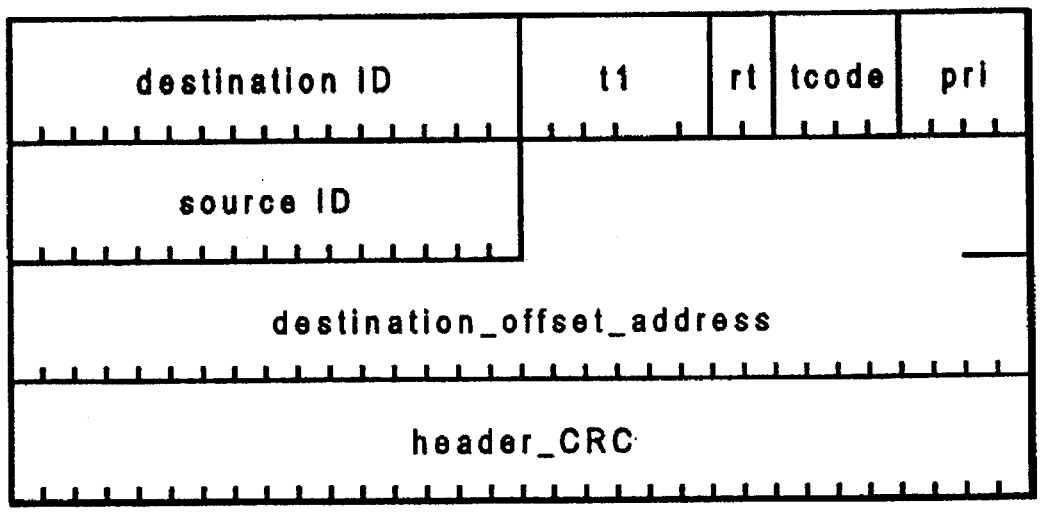
FIG. 4 is a QUAD and BLOCK read request under the P1394 protocol.
Figure 4:
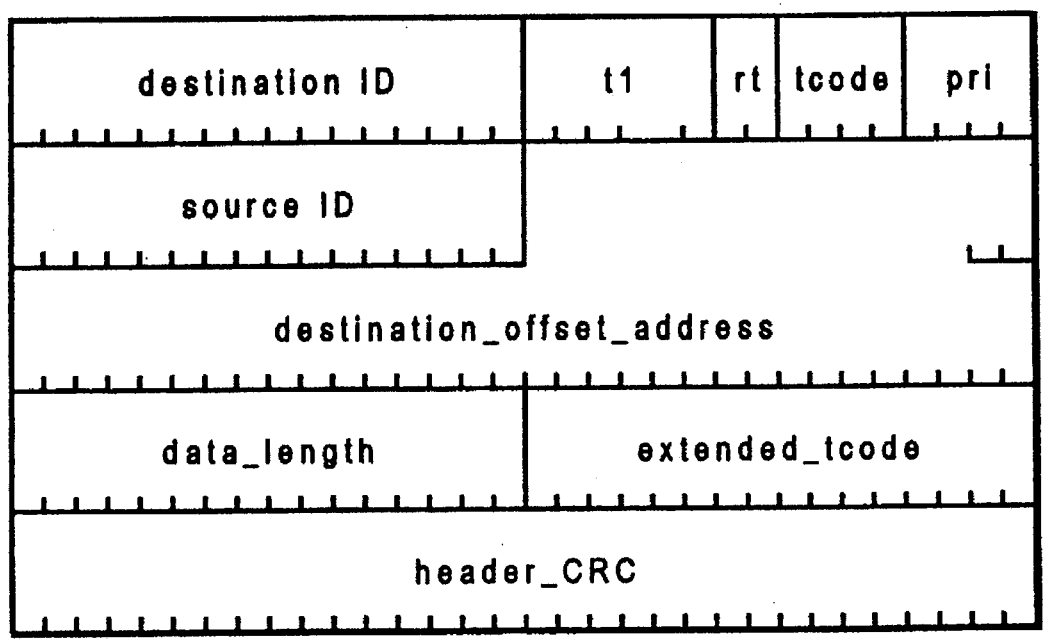

LINK chip 212 includes a LINK-to-PHY manager 310, a buffer/first-in, first out (FIFO) manager 312, and a PCI interface manager 314, which are all depicted in the block diagram of FIG. 3. Once a received read request packet enters into LINK chip 212, the packet passes through LINK-to-PHY manager 314. LINK-to-PHY manager 314 examines the header of every packet to determine if the packet should be processed by this particular LINK chip 212. If a determination is made to process a particular packet, the packet is formatted into 4-byte wide quadlets and passed, along with a transaction code, or tcode, field to buffer/PHY manager 212. The tcode field, which is taken from 4 bytes of the packet header, is used to direct the incoming packet to one of two separate receive buffers within buffer FIFO manager 312. If the tcode indicates that the packet type is a read request, the received packet is directed into the a read request buffer. The read request buffer can hold up to eight separately received read request packets. A read request packet can be either QUAD or BLOCK type as established under P1394 protocol. The format of each quadlet field for both QUAD read request and BLOCK read request packets are shown in FIG. 4.

Figure 5:
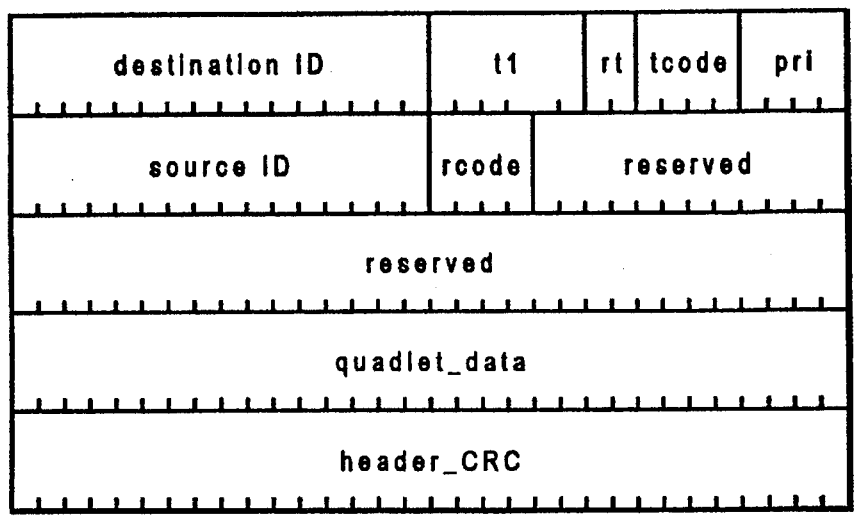
FIG. 5 is a QUAD and BLOCK read response format according to the P1394 protocol.
Figure 5:
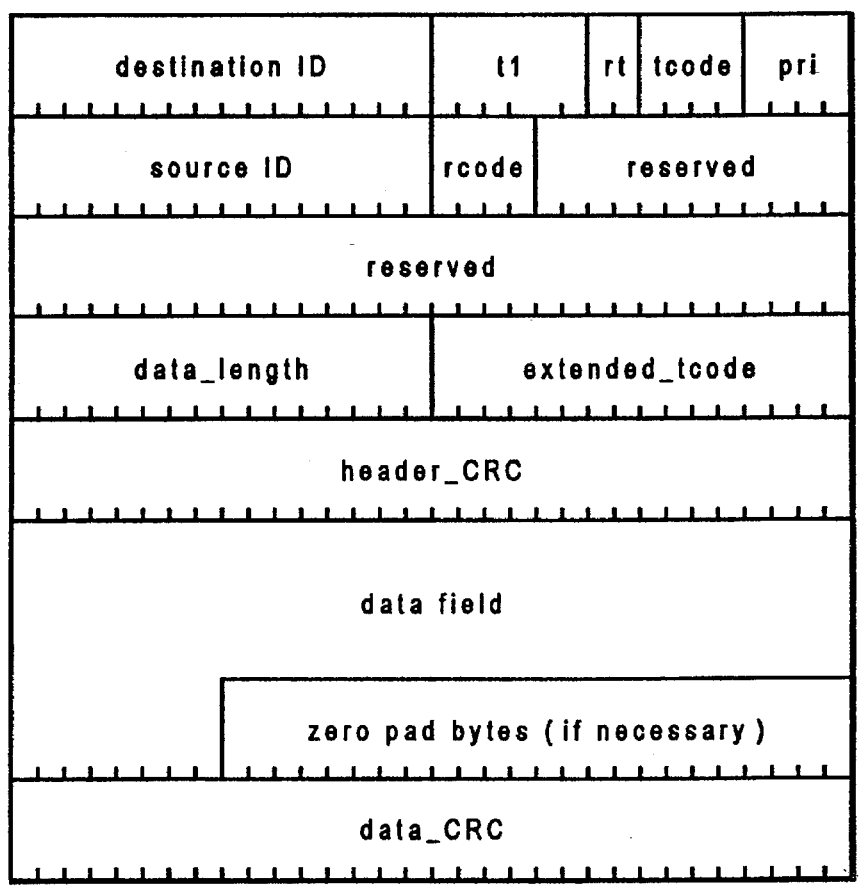

Once a complete read request packet is received into the read request buffer, a signal is issued to the read request state machine to begin a read request-to-read response packet header reformatting operation. The read request state machine reads the read request packet from the read request buffer, reformats the appropriate fields to create a read response packet header, writes this read response packet header into the chip's transmit buffer, and then programs the chip's DMA engine with the correct address and byte count values, which were obtained from the original read request packet. The chip's DMA engine then proceeds to fetch the required data from system memory and writes it into the chip's transmit buffer, following the already written read response packet header. The entire read response packet, including header and data, is now ready to be transmitted out of LINK chip 212 to PHY chip 210 and then on to P1394 bus. The formats for each quadlet field for both QUAD read response and BLOCK read response packets are shown in FIG. 5.

Figure 6:
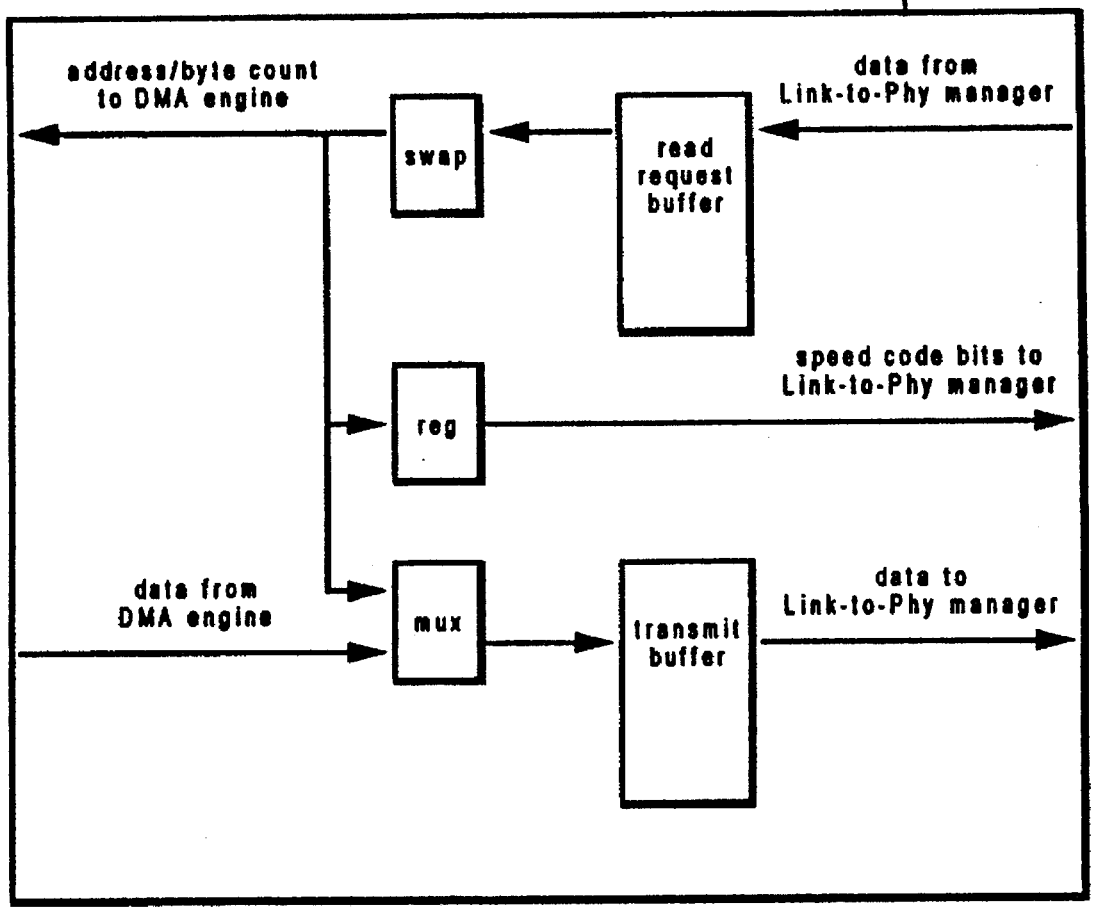
FIG. 6 depicts a block diagram of a buffer/FIFO manager according to the present invention.

In comparison, the header for the read request packet types is nearly the same as the header for the read response packet types. During the read request-to-read response packet header reformatting operation, the pri, tcode, rt, and tl fields of the read request packet header are the same for the read response packer header, so these are written, as is, to the transmit buffer. The destination ID of the read request packet becomes the source ID of the read response packet and the source ID of the read request packet becomes the destination ID of the read response packet. These fields are swapped when rewritten to the transmit buffer. The rcode and all reserved fields of the read response packet header are zeroed when written to the transmit buffer, as required under the P1394 protocol. These fields correspond to the destination offset address field of the read request packet header. This field is used as the address in system memory for the DMA engine to fetch data into the transmit buffer following the reformatting operation. For the BLOCK packet types, the data length and extended tcode fields are directly transferred to the transmit buffer. The data length field is also used by the DMA engine as the byte count to fetch data into the transmit buffer following the reformatting operation. Buffer/FIFO manager is shown in greater detail in the block diagram of FIG. 6.

In generating a read response packet header based upon a received read request packet header, the system must also correlate the bus speed according the P1394 protocol. Under P1394, three different operating speeds are possible along the serial buffs, which are 98.304 megabits per second, 196.608 megabits per second, and 393.216 megabits per second. The P1394 standard specifies that devices that operate at different speeds must coexist on the same serial bus.

When LINK chip 212 receives a read request packet, it is evident that some other device on the serial bus has transmitted the read request packet to LINK chip 212. In order to achieve the highest possible band width for the serial bus, the read response packet that is sent in response to the read request packet should be sent back at the same speed that the read request packet was received. The speed that a packet is received, however, is not part of the packet header.

Fortunately, a speed code does precede the reception of a packet as part of the normal LINK-to-PHY handshake protocol to start a packet transmission. The LINK-to-PHY manager 314 of LINK chip 212 places a speed identifier for the incoming read request packet into three bits of that packet's header tcode field. These three bits replace three bits of the actual packet header. The three bits replaced are not actually lost. These bits were not necessary for the packet header reformatting. Only one of the four bits is actually necessary and is that which distinguishes the QUAD read request from the BLOCK read request. If a QUAD read request is received, this packet is reformatted into a QUAD read response. If a BLOCK read request is received, this packet is reformatted into a BLOCK read response. During the packet reformatting procedure, the 2-bit speed code is read from the tcode field and is then used to transmit the associated read response packet at the same speed at which the read request packet was received. These two bits are sent back to the LINK-to-PHY manager 314 during packet transmission.

Figure 7:
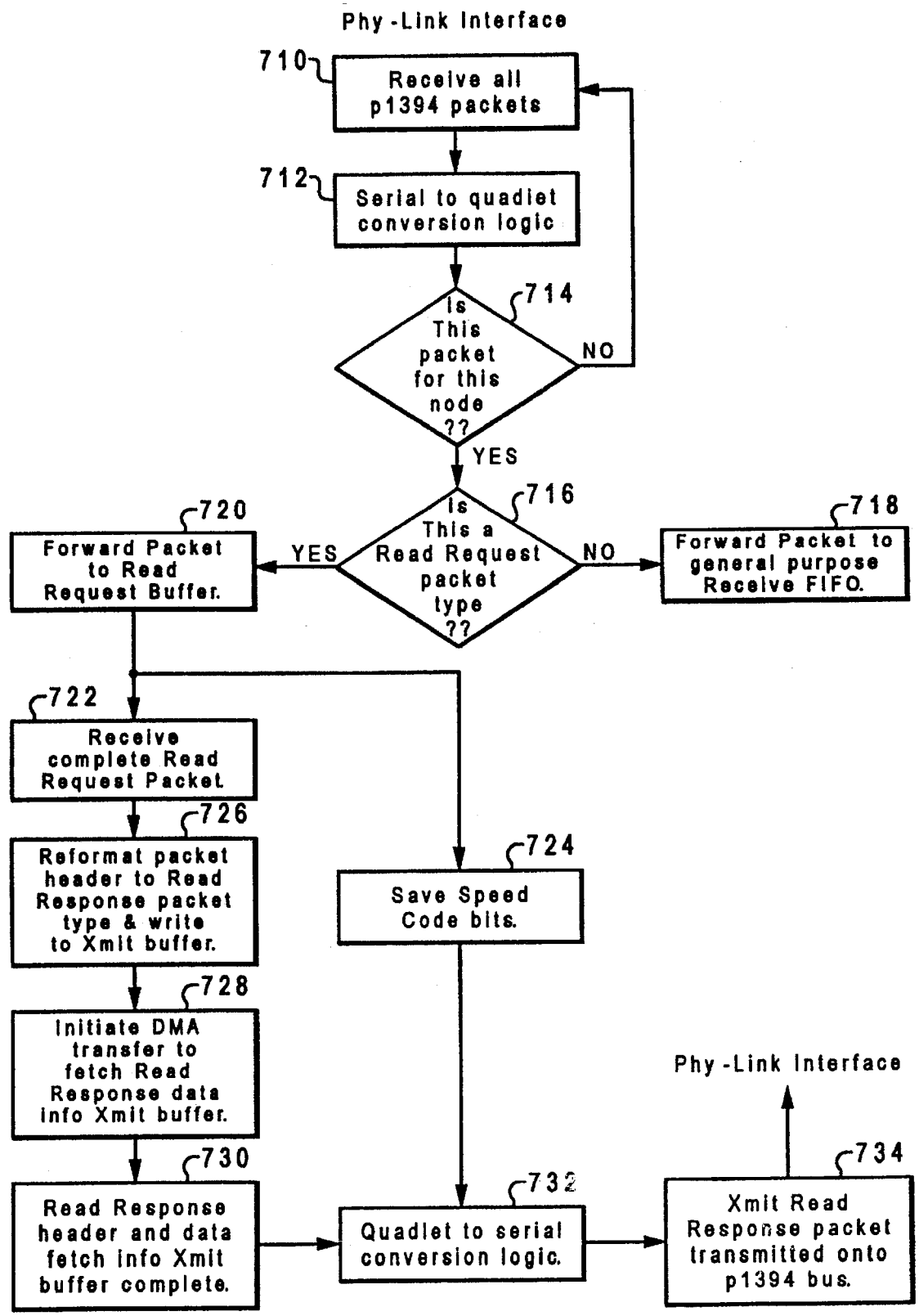
FIG. 7 depicts a flow chart of the system operation according to the present invention.

FIG. 7 depicts a block diagram of a flowchart of the operation of the Link chip 212 in FIGS. 2 and 3. In step 710, the system receives all P1394 packets across the PHY link interface. In step 712, the system converts the packets from serial data to quadlet format in the conversion logic. In step 714, the system determines whether the packet received is for this particular node and if not returns to step 710. Otherwise, the system proceeds to step 716 where the system determines whether this is a read request packet type. If, in step 716, the system determines that the packet received is not a read request, then the system proceeds to step 718 where the system forwards the packet to the general purpose receive FIFO, otherwise, the system proceeds to step 720.

The system, in step 720, forwards the packet to the read request buffer. Next, the system verifies that a complete read request packet had been received (step 722) and saves the speed code bits from the received packet (step 724). In step 726, the system reformats the packet header to a read response packet type and writes this information to the transmitter buffer. Next, in step 728, the system initiates the DMA transfer to fetch the read response data into the transmit buffer. In step 730, the system completes the read response header and fetches data from its appropriate memory location according to the address from the read response packet and places the transmit buffer. In step 732, the read response header packet is completed once the speed code bits and data are loaded into the transmit buffer and then, in step 732, the system converts the packet format from Quadlet to serial form in the conversion logic. In step 734, the system transmits the read response packet onto the P1394 bus via the PHY link interface to the original source node from which the read request packet was sent.

While the invention has been particularly shown and described with reference to a preferred embodiment, it will be understood by those skilled in the art that various changes in form and detail may be made therein without departing from the spirit and scope of the invention.

We claim:

1. In a computer system comprising a serial bus operating at a plurality of initially negotiated transmission rates for sending formatted data packets between nodes on said network bus, a method of generating a read response packet upon receipt of a read request packet by a node destination from a node source, the method comprising the steps of:

upon receipt of said read request packet, reformatting a formatted source identifier within said packet to be a destination ID in a reformatted packet;

reformatting a formatted destination ID in said read request packet to be a source identifier in said reformatted packet;

transferring additional packet information from said received packet to said reformatted packet, which step further comprises the steps of:

retrieving said requested data from said destination node by using an address in said read request packet for automatically retrieving said data via a direct memory access engine at said node and using a count field in said read request packet for automatically retrieving said data via said direct memory access engine;

retrieving a speed code from said initially negotiated transmission rate;

adding said speed code to said reformatted packet for allowing said reformatted packet to be transmitted at the same speed as said received packet; and attaching said requested data to said reformatted packet for transmitting to said source node.

2. The method according to claim 1 further comprising the step of reformatting a transaction code field in said read request packet to be a transaction code field in said reformatted packet.

3. The method according to claim 1 further comprising the step of clearing a reserve field in said read request packet and reformatting said reserve field to be a clear reserve field in said reformatted packet.

4. A serial bus operating at a plurality of initially negotiated transmission rates for sending data packets between nodes on said serial bus, further comprising a read response packet generator upon receipt of a read request packet by a node destination from a node source, the said packet generator further comprising:

means for reformatting a formatted source identifier within said packet to be a destination ID in a reformatted packet;

means for reformatting a formatted destination ID in said read request packet to be a source identifier in said reformatted packet;

means for transferring additional packet information from said received packet to said reformatted packet, which transferring means further comprises:

means for retrieving said requested data from said destination node comprising:

means for using an address in said read request packet for automatically retrieving said data via a direct memory access engine at said node; and means for using a count field in said read request packet for automatically retrieving said data via said direct memory access engine;

means for retrieving a speed code from said initially negotiated transmission rate;

means for adding said speed code to said reformateed packet for allowing said reformatted packet to be transmitted at the same speed as said received packet; and means for attaching said requested data to said reformatted packet for transmitting to said source node.

5. The apparatus according to claim 4 further comprising means for reformatting a transaction code field in said read request packet to be a transaction code field in said reformatted packet.

6. The apparatus according to claim 4 further comprising means for clearing a reserve field in said read request packet and reformatting said reserve field to be a clear reserve field in said reformatted packet.

* * * * *